United States Patent Office 2,830,975
Patented Apr. 15, 1958

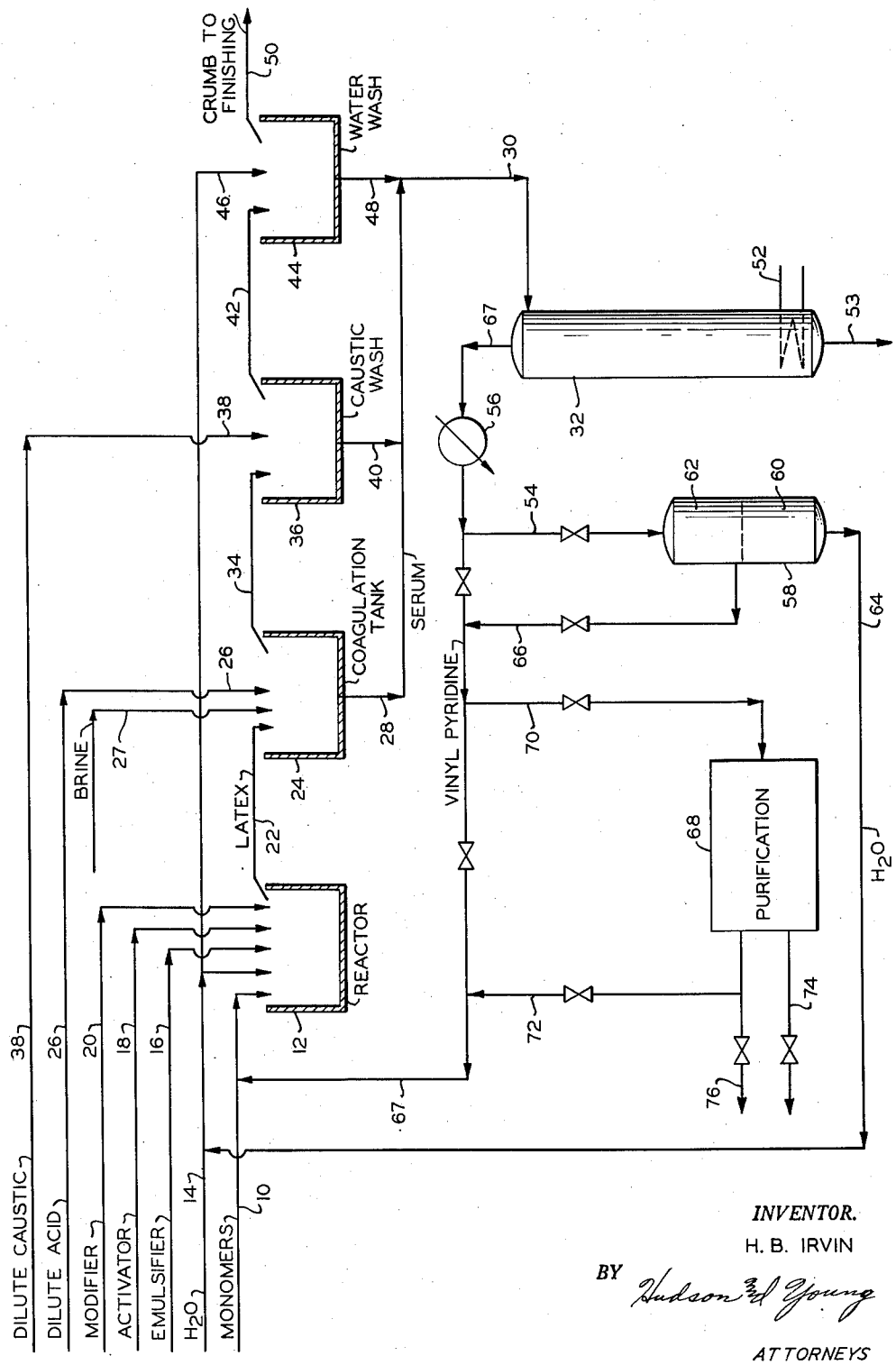

2,830,975

COPOLYMERIZATION OF A VINYLPYRIDINE AND A CONJUGATED DIENE

Howard B. Irvin, Bartlesville, Okla., assignor to Phillips Petroleum Company, a corporation of Delaware Application October 17, 1955, Serial No. 540,887

10 Claims. (Cl. 260—82.1)

This invention relates to a process for the copolymerization of a vinylpyridine with a conjugated diene and to a method of recovering unpolymerized vinylpyridine from the resulting latex.

Copolymers of vinylpyridine and a conjugated diene are conventionally made by emulsion polymerization. The reaction is usually terminated prior to completion by introduction of a shortstop to the reactant mixture. The unreacted conjugated diene (usually 1,3-butadiene) is readily removable by distillation at low pressures in conventional manner but removal of the pyridine monomer from the latex is more difficult because of foaming and polymer formation in the column. Because of the difficulty of removal of the pyridine monomer by distillation, it has been customary to extend the polymerization to 80–90 percent conversion. This has the disadvantage of requiring longer reaction times or the use of a booster charge of initiator. Even then the stripping of the high boiling monomer from the latex is troublesome. By the process of this invention, the recovery of the vinylpyridine monomer after coagulation of the polymer simplifies the recovery and permits polymerization to any conversion, although it is preferred to obtain conversions of at least 50 percent. The invention also provides for the efficient use of the recovered vinylpyridine in the polymerization process.

One object of the invention is to provide a process for the recovery of vinylpyridine monomers from latex systems in which a vinylpyridine is copolymerized with a conjugated diene. Another object of the invention is to provide a process for the recovery of vinylpyridine monomers from latex systems containing the same which is simple, operates at atmospheric pressure, entails recovery from a basic serum favorable to the separation of pyridines, and substantially avoids column fouling. A further object is to provide an improved process for the emulsion polymerization of a vinylpyridine with a conjugated diene wherein the unreacted vinylpyridine monomer is substantially completely recovered and utilized in the polymerization process. Other objects of the invention will become apparent from a consideration of the accompanying disclosure.

The copolymers with which this invention is concerned are produced by emulsion polymerization at temperatures generally in the range of 0 to 140° F. Any catalyst or initiator system can be used. Examples of some such systems are the iron pyrophosphate-hydroperoxide, either sugar-free or containing sugar, the sulfoxylate and the persulfate recipes. Any suitable emulsifier such as fatty or rosin acid soaps or the like can be used. These recipes usually contain 1–9 parts of emulsifier per 100 parts of monomers. The vinylpyridine component employed has the structural formula

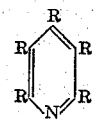

where R is hydrogen, or the alkyl, vinyl and alpha-methylvinyl (isopropenyl) groups, with at least one and not more than two of the groups being vinyl or alpha-methylvinyl groups, and the total number of carbon atoms in the alkyl groups being not greater than 12. The preferred alkyl groups are the methyl and ethyl. Some examples of these compounds are: 2-vinylpyridine, 2,5-divinylpyridine, 2-methyl-5-vinylpyridine, 2,3,4-trimethyl-5-vinylpyridine, 3-ethyl-5-vinylpyridine, 5-ethyl-2-vinylpyridine, and the like. The conjugated dienes employed are usually those containing 4 to 6 carbon atoms per molecule such as 1,3-butadiene, isoprene, piperylene, methylpentadiene, 2,3-dimethyl-1,3-butadiene, chloroprene, and others. Conjugated dienes of more than 6 carbon atoms can be used, as well as the various alkoxy, such as methoxy and ethoxy, and cyano derivatives. In the preparation of the copolymers, the amount of the conjugated diene used is generally in the range of 50–98 parts by weight per 100 parts of monomers with the vinylpyridine component in the range 50–2 parts.

When the polymerization is to be terminated, a shortstop and an antioxidant are added and the more volatile component, such as the 1,3-butadiene, is recovered by an appropriate flashing method. The latex is then, preferably, diluted with water and creamed with a saturated brine solution. This keeps the crumb fine and facilitates recovery of the vinylpyridines. The method of this invention is, however, not limited to creaming since the invention can be practiced without creaming. The polymer is then coagulated with an acidic material, such as sulfuric acid, hydrochloric acid, acetic acid, or the like. A highly ionizing acid is preferred. One method of effecting coagulation is to pass separate streams of the latex and coagulant to a coagulating vessel. Another method comprises blending separate streams of the latex and coagulant just prior to the entrance of the combined streams into the coagulating vessel. The materials are agitated during coagulation and the pH of the serum is preferably maintained below a pH of about 4.

After coagulation the serum and crumb are separated by suitable means such as by decantation, filtration, or the like. The crumb is then washed with dilute caustic and then with water and is then preferably squeezed to displace liquid therein so as to substantially completely remove the caustic and salt from the crumb. The aqueous wash solutions from both washing steps and the squeezing step are added to the serum previously separated so as to neutralize at least a portion of the acid of the serum and raise the pH of the mixture. The pH of the final mixture is determined by the character of the rubber desired and the mixture may be either basic or acidic after mixing. Sufficient alkali to alkalize the mixture is added after combining the serum and aqueous wash solutions in the event the mixture is acidic. If the wash solution is maintained at an elevated temperature, such as about 180° F., the crumb is softer and washes more easily and the solubility of the pyridine salt is more favorable and higher recovery is effected. After rendering the serum and wash solutions alkaline, the vinylpyridines may then be readily recovered by decantation of the insoluble phase, by extraction, or by distillation. However, it is preferred to recover the pyridines by distillation in the manner described below. Recovery of the vinylpyridine from the water phase by a "salting out" process with an inorganic salt, such as sodium chloride, may be desirable.

The invention also provides the following advantages over prior practices:

(1) The feed to the stripping tower is highly basic, a condition favorable for separating methyl-vinylpyridine from latex because acids form non-volatile salts with pyridines.

(2) Atmospheric operation of stripper compared to vacuum stripping of latex (as used at present on styrene recovery from GRS latex) gives (a) overhead vapors richer in methyl-vinylpyridine (because of the pressure-composition relationship for the water-pyridine azeotrope), (b) more favorable vapor-liquid equilibrium curve, (c) vacuum equipment eliminated, (d) less stripping steam, (e) little or no foaming.

(3) No fouling of stripping column because of latex. Shutdowns for cleanout less frequent.

A more complete understanding of the invention may be obtained by reference to the accompanying drawing which shows a flow in accordance with one embodiment of the invention.

The selected monomers are passed via line 10 to a stirred reactor 12 where the monomers are admixed with other constituents of a conventional recipe, including water introduced through line 14, an emulsifier through line 16, an activator through line 18, and a modifier through line 20. After the desired degree of polymerization is effected, the diene is flashed off by conventional means (not shown) and the resulting latex is transferred via line 22 to a coagulation tank 24 into which is passed dilute acid via line 26 in sufficient quantity to effect coagulation of the polymer to form a crumb. Brine may be added via line 27 when desired. The remaining liquid or serum is passed via line 28 to line 30 for passage to distillation column 32 for further treatment as hereinafter described.

The crumb is then transferred via line 34 to caustic wash tank 36 where it is washed with dilute caustic introduced via line 38. The caustic wash solution is passed via line 40 to line 30. The crumb, containing dilute caustic, is passed from wash tank 36 via line 42 to water-wash tank 44 to which water is introduced via line 46. The aqueous wash solution containing a minor amount of dilute caustic and salt is recovered via line 48 and introduced to line 30. The washed crumb is passed via line 50 to conventional finishing steps, not shown.

The combined serum, caustic wash, and water wash streams are passed from line 30 into steam distillation column 32 into which steam is introduced directly or in indirect heat exchange near the bottom via line 52. A bottom fraction containing water and impurities (principally salts) is removed from the column via line 53. An overhead fraction comprising water and vinylpyridine vapor is recovered and passed via line 54 through condenser 56 to phase separator 58 where an aqueous phase 60, containing from about 0.5 to 1.5 weight percent of vinylpyridine, collects in a lower layer and where vinylpyridine collects in an upper layer 62. The aqueous phase is recycled to recipe make-up or the the emulsion polymerization step via lines 64 and 14. The vinylpyridine-rich phase of layer 62 is passed via line 66 to line 10 and to reactor 12. It is preferred to pass all or a substantial portion of the recycled vinylpyridine phase through purification system 68 by means of lines 70 and 72. Impurities from the purification system are withdrawn through line 74 and any desired portion of the purified vinylpyridine may be recovered directly through line 76. It is also feasible to pass the overhead vinylpyridine-containing aqueous overhead fraction via line 67 directly to line 10 for return to recipe make-up, directly or via purification system 68. The process described may be operated either batchwise or continuously.

The value of the vinylpyridine component is such that its recovery even in systems where polymerization conversion is 80 percent or higher, is a definite asset. The present invention provides maximum recovery of the vinylpyridine monomer remaining in the latex after stoppage of the polymerization. It also provides extremely efficient use of the recovered vinylpyridine, particularly, in the step of utilizing the aqueous layer from the phase separator in making up the polymerization recipe.

The polymer compositions of the invention have numerous uses, particularly in the manufacture of various types of molding compositions, specialty rubbers, oil resistant rubbers, etc.

The following examples are illustrative of the invention but are not to be construed as imposing unnecessary limitations thereon.

EXAMPLE I

A butadiene/2-methyl-5-vinylpyridine copolymer was prepared by emulsion polymerization at 122° F. with the following recipe.

| | Parts by weight |
|---|---|
| Butadiene | 70 |
| 2-methyl-5-vinylpyridine [1] | 30 |
| Water | 180 |
| Potassium fatty acid soap | 5 |
| $K_2S_2O_8$ | 0.9 |
| Mixed tertiary mercaptans | 0.3 |

[1] Contained some methyl-ethylpyridine; R. I. charge 1.5390 at 25° C.

The polymerization was carried to 66 percent conversion in 8 hours. The reaction was shortstopped with 0.1 part tertiary-butylhydroquinone, based on the latex, and 2 parts, based on rubber, of phenyl-beta-naphthylamine was added as the antioxidant. After venting the latex, 300 grams of water was added to 200 grams of latex. The latex was then creamed with saturated brine.

The polymer was then coagulated with dilute sulfuric acid to bring the pH of the serum to about 3 and the resulting crumb and serum were separated by filtration. The steps of washing the recovered crumb with dilute aqueous sodium hydroxide and then with water substantially completely remove the acid and salt impurities in the crumb and recover substantially all of the vinylpyridine in the serum and wash solutions. The combined serum and wash solutions render the total solution alkaline so that distilling the mixture recovers an aqueous vinylpyridine stream readily amenable to separation upon cooling into an aqueous phase and a vinylpyridine-rich phase. About 50 percent of the vinylpyridine-rich phase is passed directly to the recipe make-up and the other half is denuded of impurities in conventional manner after which the resulting substantially pure 2-methyl-5-vinylpyridine is utilized in further recipe make-up. The aqueous phase is passed directly to recipe make-up to provide a substantial portion of the water required in the recipe and carries with it the approximately 1 percent of 2-methyl-5-vinylpyridine soluble in the water at operating temperature.

EXAMPLE II

A butadiene/2-methyl-5-vinylpyridine copolymer was prepared by emulsion polymerization at 41° F. in accordance with the following recipe:

| | Parts by weight |
|---|---|
| Water | 180 |
| Butadiene | 90 |
| 2-methyl-5-vinylpyridine [1] | 10 |
| Potassium fatty acid soap [2] | 6 |
| KOH | 0.1 |
| KCl | 0.1 |
| Daxad 11 [3] | 0.3 |
| $K_4P_2O_7$ | 0.33 |
| $FeSO_4 \cdot 7H_2O$ | 0.278 |
| Diisopropylbenzene hydroperoxide | 0.214 |
| Tert-dodecyl mercaptan | 0.45 |

Booster recipe

| | |
|---|---|
| Water | 10 |
| $K_4P_2O_7$ | 0.165 |
| $FeSO_4 \cdot 7H_2O$ | 0.139 |
| Diisopropylbenzene hydroperoxide | 0.107 |
| Tert-dodecyl mercaptan | 0.45 |

[1] Inhibitor present, 0.07 weight percent tert-butylcatechol.
[2] Potassium Office Synthetic Rubber soap.
[3] Sodium salt of condensed alkyl aryl sulfonic acid.

The ingredients in the booster recipe were added when 60 percent conversion was reached. The reaction was continued to 88 percent conversion (total reaction time, 25.5 hours). The reaction was shortstopped with 0.15 part per 100 parts of monomers charged, of Goodrite 3955 (50/50 mixture of sodium dimethyldithiocarbamate and sulfur in the form of sodium polysulfide) and 2 parts of phenyl-beta-naphthylamine per 100 parts of polymer was added as the antioxidant. After stripping, the coagulated polymer had a Mooney value (ML-4) of 23.

Example II illustrates another emulsion copolymerization recipe which is amenable to treatment and processing in accordance with the invention to recover the unreacted vinylpyridine and make the maximum utilization of the unreacted material. However, it is advantageous to omit use of the booster, recovering the butadiene by conventional flashing and the vinylpyridine in accordance with the invention, after 60–65 percent conversion. This method of operation conserves polymerization time, while avoiding loss of any appreciable amount of monomer. Where polysulfides are present in the serum, as in Example II (sodium polysulfide of shortstop), the tendency towards polymerization of the methyl-vinylpyridine in the coagulation tank is inhibited thereby.

Certain modifications of the invention will become apparent to those skilled in the art and the illustrative details disclosed are not to be construed as imposing unnecessary limitations on the invention.

I claim:

1. A process for recovering vinylpyridine from a latex comprising a copolymer of a vinylpyridine and a conjugated diene, comprising adding an acid coagulant to said latex so as to coagulate said copolymer; separating coagulated copolymer from the resulting serum; washing the separated copolymer with a dilute aqueous alkali; washing the alkali-washed copolymer with water; combining the alkali wash and water wash from the washing steps with said serum and rendering same basic; and recovering vinylpyridine from the resulting alkaline mixture.

2. The process of claim 1 wherein vinylpyridine is recovered from said alkaline solution by distilling same therefrom together with water; and the distillate is separated by phase separation into an aqueous layer containing up to about one weight percent vinylpyridine, and a vinylpyridine-rich phase.

3. The process of claim 1 wherein the acid coagulant comprises sulfuric acid and the alkali comprises sodium hydroxide.

4. The process of claim 1 wherein the vinylpyridine comprises 2-methyl-5-vinylpyridine and the diene comprises 1,3-butadiene.

5. A process for polymerizing a vinylpyridine with a conjugated diene which comprises preparing an aqueous emulsion polymerization recipe and effecting copolymerization of said vinylpyridine and said diene to form a latex containing unreacted monomers; adding an acid coagulant to said latex so as to coagulate said copolymer; separating coagulated copolymer from the resulting serum; washing the separated copolymer with a dilute aqueous alkali; washing the alkali-washed copolymer with water; combining the alkali wash and water wash from the washing steps with said serum and rendering same basic; and recovering vinylpyridine from the resulting alkaline mixture.

6. The process of claim 5 including the steps of distilling said alkaline mixture so as to recover an overhead fraction comprising water and vinylpyridine; separating said overhead fraction into an aqueous layer and a vinylpyridine-rich layer, said aqueous layer containing from 0.5 to 1.5 weight percent of vinylpyridine; and incorporating said aqueous layer in said aqueous emulsion.

7. The process of claim 5 including the steps of distilling said alkaline mixture so as to recover an overhead fraction comprising water and vinylpyridine; separating said overhead fraction into an aqueous layer and a vinylpyridine-rich layer; and incorporating said vinylpyridine-rich layer in said aqueous emulsion.

8. The process of claim 5 including the steps of distilling said alkaline mixture so as to recover an overhead fraction comprising water and vinylpyridine; separating said overhead fraction into an aqueous layer and a vinylpyridine-rich layer; utilizing a portion of said vinylpyridine-rich layer in preparing said aqueous emulsion; removing impurities from the remaining portion; and incorporating the purified vinylpyridine in said aqueous emulsion.

9. The process of claim 5 including the steps of distilling said alkaline mixture so as to recover an overhead fraction comprising water and vinylpyridine; and incorporating said overhead fraction in said aqueous emulsion.

10. The process of claim 9 wherein the vinylpyridine comprises 2-methyl-5-vinylpyridine and the diene comprises 1,3-butadiene.

References Cited in the file of this patent

UNITED STATES PATENTS

| 2,458,456 | Wolk | Jan. 9, 1949 |
| 2,640,042 | Howland et al. | May 26, 1952 |

FOREIGN PATENTS

| 609,059 | Great Britain | Sept. 24, 1948 |

OTHER REFERENCES

Frank et al.: vol. 40, #5, May 1948, pp. 879–82 (Ind. Eng. Chem.).